United States Patent Office 2,757,080
Patented July 31, 1956

2,757,080

SEPARATION OF NICKEL FROM SOLUTIONS CONTAINING NICKEL AND COBALT

Marcel De Merre, Hoboken-lez-Anvers, Belgium, assignor to Societe Generale Metallurgique de Hoboken, Hoboken-lez-Anvers, Belgium, a corporation of Belgium No Drawing. Application October 20, 1952,
Serial No. 315,845

Claims priority, application Great Britain July 12, 1948

4 Claims. (Cl. 75—119)

This invention relates to separation of nickel from solutions containing nickel and cobalt; and it comprises a process of separating nickel from aqueous nickel-cobalt solutions wherein such a solution is treated at temperatures within the range of from about room temperature to 100° C. at a pH of from about 1 to 5.5, in the presence of finely-divided metallic iron and a material selected from a class consisting of sulfur, arsenic, antimony, selenium and tellurium, the metallic iron being present in excess of combining proportions with any free metalloid present, or in the presence of metallic iron and compounds of metalloids with iron; the quantity of material added being sufficient to precipitate nickel from the solution; and then separating the resulting precipitate; all as more fully hereinafter set forth and as claimed.

This application is a continuation-in-part of my copending application, Serial No. 101,690, filed June 27, 1949, and now abandoned. The disclosure of this prior case has been amplified in the present application.

The object of the present invention is the treatment of aqueous solutions containing dissolved therein nickel and cobalt, to produce separation of the nickel from the cobalt.

Owing to the recent greatly increased demand for pure cobalt, practical methods of removing nickel from cobalt solutions have come to be of great importance. While several methods for this separation have been developed in the art, none has proved to be entirely satisfactory for commercial operations. These nickel-cobalt solutions are usually obtained during the treatment of ores containing nickel and cobalt or by dissolution of nickel-cobalt alloys.

I have discovered that a selective or preferential precipitation of nickel from nickel-cobalt solutions can be obtained by treating such solutions, at temperatures ranging from about room temperature to 100° C., in the presence of metallic iron and a metalloid selected from a class consisting of sulfur, arsenic, antimony, selenium, and tellurium or in the presence of metallic iron and a compound of one of these metalloids with iron, while controlling the pH of the solution within the range of from about 1 to 5.5. Thus I have found it possible to precipitate the nickel by the use of an excess of iron plus an -ide compound selected from the class consisting of sulfur, arsenic, etc. or iron plus iron sulfide, iron arsenide, iron antimonide, iron selenide and iron telluride. In each case the major proportion of the nickel is precipitated from the nickel-cobalt solution in the form of the corresponding -ide compound. An iron sulfide can be employed which is obtained either by a wet process or by smelting. The product obtained by smelting usually contains sufficient metallic iron, in addition to the sulfide, to be employed in my process without further addition of iron.

It is necessary to have the iron present in excess of combining proportions with any free metalloid present in order to obtain the desired selective precipitation of the nickel. The pH range is also critical. The cause for this selective precipitation is not fully understood since it appears contrary to the results to be expected from the solubility product constants, but the facts remain as stated.

The process is applicable to a wide range of solutions containing nickel and cobalt in ratios varying from below about 0.5 to 100 to ratios in excess of 100 to 100. And these solutions may contain salts of other metals, such as iron, zinc, manganese, copper and lead. If these metals are present the copper and lead are precipitated with the nickel while iron, zinc and manganese remain in solution with the cobalt. During the process the metallic iron, which is added to precipitate the nickel, partially dissolves in the solution.

In place of the metalloids in elemental form use may also be made of complex materials, such as metallurgical by-products, for instance of the arsenide type.

The nickel and cobalt may be present in the solution to be treated in the form of their water-soluble salts with any anions which produce no harmful side reactions during the process. Thus the method is operative to separate the sulfates and the chlorides, for example.

While the pH may vary from about 1 to 5.5 during the reaction, best results are obtained towards the end of the process within the narrower range of from about 3 to 5.5. In order to maintain the pH within the desired range acid may be added from time to time during the process. The pH at the start of the process may be below 1 but it increases during the process to a value within the upper end of said range of 1 to 5.5 or to a value within the range of from 3 to 5.5 pH.

The temperature used in the process is not critical but the reaction time is shortened substantially at the higher temperatures. For this reason, I prefer to operate at temperatures ranging from about 80° to 100° C. although lower temperatures, even down to room temperature, can be employed if desired. Agitation of the solution during the treatment is advantageous. While it is usually advisable to employ finely-divided iron, larger pieces can be employed if desired.

I have found that it is usually possible by the procedure described to precipitate the major proportion of the nickel and to reduce the ratio of nickel to cobalt in the treated nickel-cobalt solution to a value of 0.05 to 100 or less.

My invention can be described in greater detail by reference to the following specific examples which represent practical operating embodiments of my new process.

*Example 1*

One liter of a slightly acid solution containing 55 grams of cobalt and 350 mg. of nickel per liter, having a pH of about 2, is treated with 50 grams of a 200 mesh commercial iron sulfide obtained by smelting. This iron sulfide contains 19.7% of uncombined iron, while its content of FeS is 73.7% by weight, calculated from its sulfur content. The soltuion is stirred and heated to temperatures within the range of from about 90° to 100° C. for a period of about 3 hours. The resulting sulfide precipitate is then filtered off. The solution is found to contain only 22 mg. of nickel per liter and 54.5 g. of cobalt. Thus the original Ni:Co ratio of 0.65:100 is reduced to 0.04:100.

*Example 2*

In this example a nickel-cobalt solution is treated which contains, in the form of their sulfates, 54 grams per liter of cobalt and 5.7 grams per liter of nickel. A liter of this solution is acidified to a pH of 1.7. 200 g. of a Fe—Sb compound obtained by fusion, are then added, containing 40% Sb and 60% Fe and ground to 65 mesh. 300 g. of 65 mesh iron powder are also added. This mixture is heated to a temperature of about 85° C. under conditions of agitation for a period of 5 hours, the precipitate then being filtered off. The filtrate contains 51.4 g./l. cobalt, 0.31 g./l. nickel and its pH is 5.2. The original solution has a ratio of Ni to Co of 10.5:100 while the filtrate has a corresponding ratio of 0.6:100.

*Example 3*

One liter of a nickel-cobalt solution containing, in the form of their chlorides, 51 grams per liter of cobalt and 5.3 grams per liter of nickel, is acidified to a pH of 1.7. To this solution there are added 200 g. of a 65 mesh Fe—As compound obtained by fusion and containing 20% As and 80% Fe. 300 grams of 65 mesh iron powder are also added. This mixture is heated to a temperature of 85° C. for a period of 5 hours while stirring, after which the resulting precipitate is filtered off. The filtrate contains 47.9 g./l. of cobalt and 0.34 g./l. of nickel, while its pH is 5.4. The original solution contains a ratio of nickel:cobalt of 10.2:100 while the filtrate has a corresponding ratio of 0.7:100.

*Example 4*

One liter of a nickel-cobalt solution containing 51.0 g./l. of cobalt and 5.3 g./l. of nickel in the form of their sulfates is acidified to a pH of 1.7 and then is treated by adding 200 g. of a 65 mesh Fe—Se compound, obtained by fusion and containing 50% Fe and 50% Se, and 300 g. of 65 mesh iron powder, followed by heating the mixture while stirring to a temperature of about 85° C. The resulting precipitate is then filtered off. The filtrate contains 46.2 g./l. of cobalt and 0.07 g./l. of nickel and has a pH of 5.4. The original solution has a ratio of nickel to cobalt of 10.2:100 while the filtrate has a corresponding ratio of 0.15:100.

In other extensive tests, I have found that iron telluride can be substituted for the iron sulfide, the iron antimonide and the iron selenide, used in the above examples, with almost identical results. I have also found it possible to substitute these iron metalloid compounds in whole or in part with the free metalloids with the production of substantially the same results. When the free metalloids are employed the corresponding -ide compounds are formed during the reaction.

While I have described what I consider to be the best embodiments of my process it is evident, of course, that various modifications can be made in the specific procedures which have been described without departing from the purview of this invention. Thus, as mentioned previously, the solutions to be treated may contain various impurities without substantially altering the selective precipitation of nickel therefrom. If desired, the process can be conducted continuously, for instance by passing a nickel-cobalt solution, in the presence of iron powder and metalloid or of iron plus metalloid compound, through a heating and agitating zone and then continuously filtering off the resulting precipitate. The amounts of iron powder and metalloid or iron-metalloid compound to be added are not critical since an excess of these reagents does no harm. Of course, the larger the quantity of the reagents added, the quicker the reaction takes place and the more complete, within limits, is the precipitation of the nickel. It is possible to recover any excess iron powder and metalloid or iron-metalloid compound from the precipitate and to reuse these reagents in a repetition of the process. My process can be operated under pressure and at temperatures above the boiling point of the nickel-cobalt solution, if desired. Further modifications of my process which fall within the scope of the following claims will be immediately evident to those skilled in this art.

What I claim is:

1. In the removal of nickel from aqueous solutions containing nickel and cobalt in the form of their soluble salts, selected from the group consisting of sulfates and chlorides, and in a ratio within the range of from about 0.5 Ni:100 Co to 100 Ni:100 Co; the process which comprises heating such a solution to a temperature within the range of from about 80° to 100° C. and at a pH of from about 3 to 5.5, said solution containing an excess of uncombined metallic iron and an -ide compound of iron, selected from the class consisting of iron monosulfide, iron arsenide, iron antimonide, iron selenide and iron telluride, in amount sufficient substantially completely to precipitate the nickel from the solution in the form of its corresponding -ide compound, and separating the resulting precipitate from the solution.

2. The process of claim 1 wherein the pH at the start of the process is below the said range of from 3 to 5.5 but increases during the process to a value within said range.

3. The process of claim 1 wherein the -ide compound of iron is formed in the solution in situ by the addition to the solution of finely-divided metallic iron and an element selected from the group consisting of sulfur, arsenic, antimony, selenium and tellurium.

4. In the removal of nickel from aqueous acid solutions containing nickel and cobalt in the form of their soluble salts, selected from the group consisting of sulfates and chlorides, and in a ratio within the range of from about 0.5 Ni:100 Co to 100 Ni:100 Co; the process which comprises heating such a solution to a temperature within the range of from about 80° to 100° C. and at a pH within the range of from about 3 to 5.5, said solution containing an excess of uncombined metallic iron and iron monosulfide in amount sufficient substantially completely to precipitate the nickel from the solution in the form of its sulfide, and separating the precipitate from the solution.

References Cited in the file of this patent

UNITED STATES PATENTS

| | | |
|---|---|---|
| 1,592,306 | Lienhardt | July 13, 1926 |
| 2,352,096 | Hays | June 20, 1944 |
| 2,509,916 | Griffith et al. | May 30, 1950 |

OTHER REFERENCES

Comey and Hahn (Editors): "A Dictionary of Chemical Solubilities (Inorganic)," The MacMillan Co., New York, N. Y. (1921) (2nd ed.), pages 424 and 437.

Seidell: "Solubilities of Inorganic and Organic Compounds," D. Van Nostrand Co. Inc., New York, N. Y., 1928, vol. II, pages 1178 and 1316.

Mellor, J. W.: "A Comprehensive Treatise on Inorganic and Theoretical Chemistry," Longmans, Green & Co., London (1935), vol. 14, pages 159, 160 and 751.

Latimer, W. M.: "Oxidation Potentials," Prentice-Hall, New York, N. Y. (1938), pages 294, 295 and 316.

Hodgman et al. (Editors): "Handbook of Chemistry and Physics" (28th ed.), Chemical Rubber Publishing Co., Cleveland, Ohio (1944), pages 1363, 1364, 1380 and 1381.